April 28, 1959    L. V. LANDGREEN    2,883,878
MOTION TRANSMITTING MECHANISM
Filed Sept. 20, 1955

*INVENTOR.*
LOWELL V. LANDGREEN
BY
*Bauer and Seymour*
ATTORNEYS

United States Patent Office 2,883,878
Patented Apr. 28, 1959

2,883,878

MOTION TRANSMITTING MECHANISM

Lowell V. Landgreen, Beaver City, Nebr.

Application September 20, 1955, Serial No. 535,387

8 Claims. (Cl. 74—496)

This invention relates to motion transmitting apparatus and more particularly to mechanisms adapted for use in the steering devices of vehicles and the like.

An important object of this invention is to promote safety in the operation of motor vehicles and thereby reduce the deaths, injuries and property damage resulting from accidents on the highways.

It is a matter of common knowledge that many automobile accidents which result in injury to and death of scores of persons and in damage to the vehicles are caused by the driver losing control when the front or steering wheels of the vehicle are displaced by striking even a small obstruction or the like in the road. A primary object of the present invention is to provide a novel vehicle steering device which will obviate many accidents of the above character and others that result from the loss of control traceable to the steering mechanism.

Another object of the invention is to provide a novel motion transmitting mechanism adapted for use, by way of example, in actuating the front wheels of a vehicle to effect steering of the latter.

Still another object is to provide novelly constructed apparatus which makes manual or power steering of a vehicle easier and safer.

A further object is to provide novel means for steering a vehicle whereby the full normal steering movement of the vehicle wheels may be easily obtained by a half revolution of the operator actuated steering wheel, thus making it practical to use only a half wheel which gives increased and improved vision ahead of the vehicle.

A still further object is to provide a novel vehicle steering apparatus or the like which may be operated with ease by the steering wheel but is substantially irreversible by application of force to the vehicle wheels.

Another object is to provide a novel vehicle steering device which is so constructed as to permit safe operation with finger-tip pressure control.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

Figure 1:
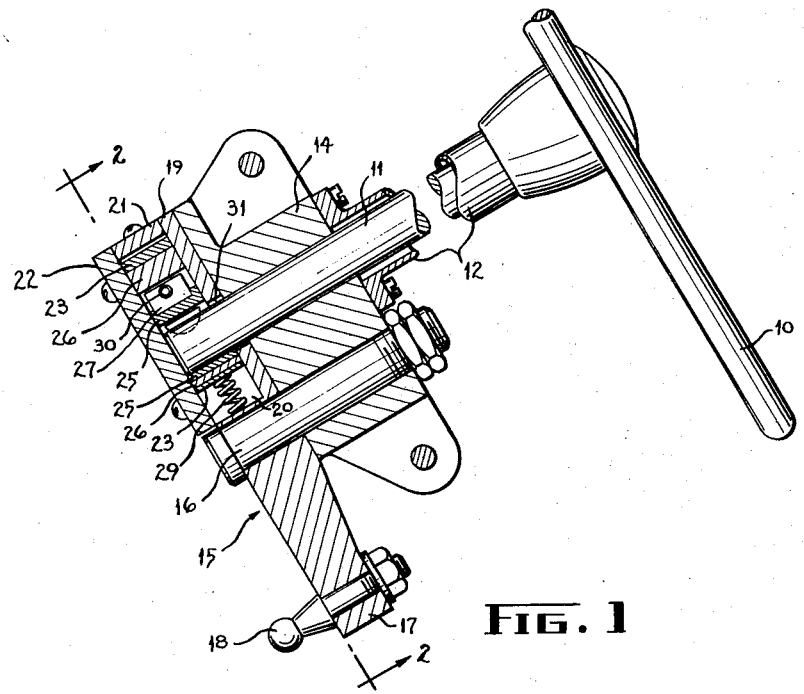
Figure 2:
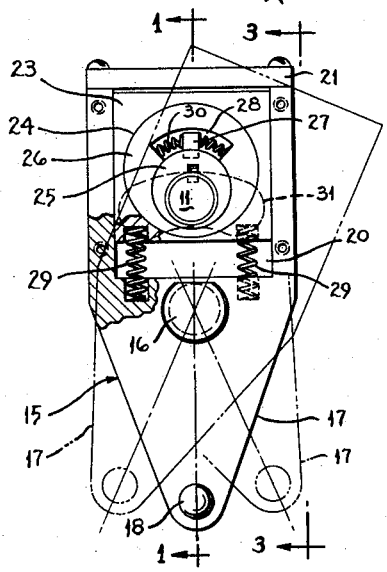
Figure 3:
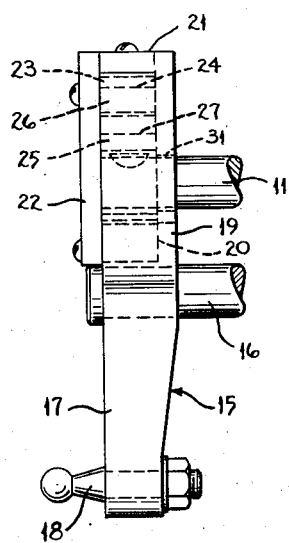

In the drawings, wherein like reference characters refer to like parts throughout the several views, Fig. 1 is a side view, partly in section and with parts broken away, of one form of a vehicle steering device embodying the present invention, the section being taken substantially on line 1—1 of Fig. 2;

Fig. 2 is an end view taken substantially on line 2—2 of Fig. 1, showing the novel motion transmitting mechanism of said device with a cover plate removed and partly in section; and Fig. 3 is a side elevation taken in the plane of line 3—3 of Fig. 2.

A single embodiment of the invention is illustrated, by way of example, in the accompanying drawing in the form of a manually operable steering mechanism for a motor vehicle. It will be readily apparent, however, that the invention in its broadest scope may be easily adapted to other uses. In the form shown, a steering wheel 10 is secured in any known manner to the upper end of a steering post 11. The latter extends through a stationary tube 12 and is rotatably journalled near its lower end in a rigidly mounted bracket 14.

Novel means are comprehended by the invention for transmitting angular motion of the steering column 11 to the front or guiding wheels of a vehicle (not shown). Said means are so constructed that the front wheels may be quickly and easily turned by actuation of steering wheel 10, but are substantially locked against turning by pressure or force applied directly thereto. The novel mechanism of the invention thus substantially prevents turning of the wheels and resultant loss of control of the vehicle when the wheels engage an obstruction in the road. The quick and easy manipulation of the guiding wheels from the steering wheel also gives the operator or driver easier and better control for maneuvering the vehicle quickly when the need for quick action arises.

In the illustrated embodiment, the novel motion transmitting mechanism comprises a plate or lever block 15 which is pivotally mounted for angular movement on a pin or shaft 16. The latter is mounted in bracket 14 in spaced relation and parallel to steering post 11. Pin 16 may turn with lever block 15 and hence, could be integral therewith or it may be stationary and hence, could be integral with bracket 14 or otherwise suitably mounted on the chassis of the vehicle. The arm 17 of lever 15 that extends downwardly from supporting pin 16 has a ball pin 18 fixed therein for connection in a well known manner to the steering rod leading to the front or guiding wheels of the vehicle.

The upper arm 19 of lever 15 has a rectangular recess 20 in the lower or outer face thereof, as viewed in Fig. 1. The upper wall of the recess is a removable plate 21, and the end or outer wall is a removable plate 22, said closure plates being secured to lever member 15 by set screws or other suitable known means.

Within the cavity or recess 20 is a sliding block 23 which has a sliding fit between the side and end walls of the cavity and limited vertical movement between the top and bottom walls. Said block has a cylindrical opening 24 therein, into which steering post 11 extends. Mounted on post 11 and keyed thereto for rotation therewith is a small cylindrical plate or disc 25. A second and larger cylindrical plate 26 has a sliding fit in opening 24 and a sliding fit around plate 25. The latter is eccentric with respect to steering post 11, and plate 26 is eccentric with respect to both post 11 and eccentric disc 25. A lost motion connection is provided between the two eccentric discs, and in the form shown, said connection comprises a key 27 on disc 25 and a cooperating but much wider keyway 28 inside of disc 26.

When the front wheels of the vehicle are in neutral or unturned position, the parts of the above described steering mechanism are in the illustrated position with the radially thickest portions of the eccentric discs 25 and 26 and key 27 uppermost (Fig. 2), the latter being centered in keyway 28. In this position, lever block 15 is vertical, and sliding block 23 is at the upper limit of its travel in cavity 20. Although the mechanism will naturally and automatically assume this neutral or central position upon movement of the vehicle, it may be desirable to provide resilient means, such as springs 29, interposed between the block and the bottom wall of the cavity for urging block 23 toward its upper position and springs 30 which tend to maintain eccentric disc 25. Springs 30 are interposed between key 27 and opposed walls of keyway 28 and are of equal strength.

To turn the vehicle in either direction, the steering wheel 10 and hence, steering column 11, are turned in the appropriate direction. This imparts angular movement to eccentric disc 25 within and relative to disc 26. Thus, as the radially thick portion of disc 25 moves to one side of post 11, lever block 15 is pivoted about the axis of pin 16 and, through ball pin 18, effects a turning movement of the front wheels of the vehicle. The mechanical advantage of the mechanism for this movement may be varied by varying the size or eccentricity of disc 25. Although this eccentric type of linkage makes it easy to transmit motion from the wheel 10 to the vehicle wheels, it will be seen that it is very difficult to transmit motion in the reverse direction when the parts are in central or neutral position. Thus, when the vehicle is traveling straight, it is substantially impossible that any force applied to the front wheels can throw the vehicle off course.

A very large percentage of the normal driving of a vehicle takes place within the range of movement of disc 25 permitted by the lost motion connection 27, 28. When the limit of this motion is reached in either direction and key 27 engages a wall of keyway 28, either directly or effectively through a spring 30, continued angular movement of shaft 11 and disc 25 will impart similar movement to eccentric disc 26 and thence to lever block 15. A maximum turn is effected when disc 26 has been turned 90 degrees in either direction from its neutral position. The movement thus transmitted to ball pin 18 is sufficient to turn the front wheels the maximum desired amount. The device may accordingly be designed so that approximately a one-half revolution of the wheel 10 is sufficient to move the front wheels from a maximum right turn position to a maximum left turn position. This fact makes it feasible to use a steering wheel which is less than a complete circle, thereby improving the driver's visibility.

The angular movement of lever block 15 relative to steering column 11 is permitted by an arcuate slot 31 in the end wall of cavity 20. If desired, bracket 14 may be designed to cover slot 31 throughout its range of movement, or a suitable separate plate or cover may be provided for the purpose.

There is thus provided a novel motion transmitting mechanism which is particularly adapted for installation in the steering system of a motor vehicle to thereby create a novel steering system which is simple in design and operation as well as durable and dependable in use. The apparatus does not embody any worms or gears, such as are common in known steering systems, but operates with reduced friction and hence, with greater ease and facility. This is believed to be the most practical improvement yet made in vehicle steering apparatus. It permits safe, effortless driving through controlled steering. The novel device comprehended by the invention automatically holds the vehicle on either a straight or desired curved course of direction without appreciable effort on the part of the operator, thereby giving him a greater measure of control. The ratio of leverage built into the present device is such that the driver need turn the steering wheel but half or less than half the distance required in present day steering devices to negotiate the same turn. The device effectively places the operator or driver closer to any object or hazard that may come into the path of the vehicle and makes it easier for him to veer away from it to avoid damage to the vehicle and injury to its occupants. Of primary importance is the fact that this device is effective to take care of shocks such as result from the front or steering wheels engaging objects in the road. Thus, the device gives the operator complete assurance that the vehicle will maintain its course of travel independently of the nature of the road surface. The driver may depend with confidence upon the present device for keeping his vehicle in control on all kinds of roads as well as in fields of soft dirt, gravel and the like. This automatic control lessens the required effort and hence, lessens fatigue during long periods of driving.

Although only a single embodiment of the invention has been illustrated in the drawings and described in detail in the foregoing specification, it is to be expressly understood that the invention in its broadest scope is not so limited. For example, roller or ball bearings may be provided for steering post 11, around discs 25 and 26 and for lever 15 on pin 16. Other types of resilient means could also be substituted for the coil springs 29 and 30. It will also be apparent that additional larger eccentric discs may be provided around disc 26 and operatively connected thereto in series by lost motion connections, such as connection 27, 28. Various other changes, such as in the specific design and arrangement of the parts illustrated, may be made without departing from the spirit and scope of the invention as the same will now be understood by those skilled in the art.

What is claimed is:

1. Steering apparatus for a vehicle comprising an angularly movable steering post, a lever mounted for pivotal movement about an axis in spaced relation and parallel to the axis of said post, a block mounted in said lever for angular movement therewith and linear movement relative thereto, said block having a cylindrical opening therein, a first disc slidably fitting in said opening, said disc having a cylindrical opening therein eccentric with respect to the axis of the disc, a second cylindrical disc slidably fitting the opening in said first disc and eccentrically mounted on said post for angular movement therewith, and a lost motion connection between said discs, whereby angular movement of said discs imparts pivotal movement to said lever.

2. Apparatus as defined in claim 1 wherein said lost motion connection includes a key on one of the discs and a keyway wider than the key in the other disc.

3. Apparatus as defined in claim 1 comprising resilient means for yieldably maintaining the discs at the center of their travel relative to each other.

4. Apparatus as defined in claim 1 comprising resilient means for yieldably urging said block in one direction of its travel.

5. Apparatus as defined in claim 1 wherein the elements are assembled so that when the centers of said discs and said axes are in a straight line the lost motion connection will be centered with respect to the limits of movement of one disc relative to the other.

6. Motion transmitting mechanism comprising an angularly movable shaft, a disc eccentrically mounted on said shaft for angular movement therewith, a lever mounted for pivotal movement about an axis parallel to the axis of said shaft, means radially slidable on said lever, said means having a sliding fit around said disc, whereby angular movement of the shaft and disc imparts pivotal movement to said lever, said radially slidable means comprising a second disc eccentrically surrounding said first-named disc and said shaft, and said discs being operatively connected by a lost motion connection.

7. Motion transmitting apparatus comprising means angularly movable about a first axis, means mounted for pivotal movement about a second axis, and means for converting angular movement of said first-named means into pivotal movement of said second-named means including a first disc eccentrically connected to said first-named means, a second disc closely eccentrically surrounding said first disc and eccentric to said first-named means and means closely surrounding said second disc and including a part mounted for radial linear movement relative to said second axis and said second-named means, said discs being connected for angular movement by a lost-motion connection.

8. Motion transmitting apparatus as defined in claim 7 wherein said lost motion connection comprises a radial projection on one disc and a groove for said projection in the other disc, said groove being of greater angular extent than said projection.

References Cited in the file of this patent

UNITED STATES PATENTS

| | | |
|---|---|---|
| 619,824 | Fetzer | Feb. 21, 1899 |
| 1,349,415 | Dyer | Aug. 10, 1920 |
| 1,418,679 | Schipper | June 6, 1932 |
| 1,440,666 | Flora et al. | Jan. 2, 1933 |

FOREIGN PATENTS

| | | |
|---|---|---|
| 17,779 | Great Britain | Aug. 11, 1896 |
| 485,426 | Italy | Oct. 13, 1953 |

OTHER REFERENCES

Publication: Heldt, "Transmission, Running Gear and Control," p. 419, 1920.